US008715065B2

(12) United States Patent
Smith

(10) Patent No.: US 8,715,065 B2
(45) Date of Patent: May 6, 2014

(54) PROCESSING CRITICAL DATA SETS IN NON-VOLATILE MEMORY

(75) Inventor: Jason A. Smith, Vernon Hills, IL (US)

(73) Assignee: WMS Gaming, Inc., Waukegan, IL (US)

(*) Notice: Subject to any disclaimer, the term of this patent is extended or adjusted under 35 U.S.C. 154(b) by 626 days.

(21) Appl. No.: 12/865,761

(22) PCT Filed: Feb. 12, 2009

(86) PCT No.: PCT/US2009/033845
§ 371 (c)(1), (2), (4) Date: Aug. 2, 2010

(87) PCT Pub. No.: WO2009/102823
PCT Pub. Date: Aug. 20, 2009

(65) Prior Publication Data

US 2010/0323786 A1 Dec. 23, 2010

Related U.S. Application Data

(60) Provisional application No. 61/028,370, filed on Feb. 13, 2008.

(51) Int. Cl.
*A63F 13/10* (2006.01)
*G06F 12/00* (2006.01)

(52) U.S. Cl.
USPC ................ 463/25; 463/43; 711/133; 711/142

(58) Field of Classification Search
USPC ............ 463/25, 43, 16, 24, 29; 711/170, 103, 711/118, 133, 135, 142, 162, 173
See application file for complete search history.

(56) References Cited

U.S. PATENT DOCUMENTS

2007/0207854 A1 9/2007 Wolf et al.
2007/0266220 A1 11/2007 Nelson
2007/0281793 A1 12/2007 Sylla

FOREIGN PATENT DOCUMENTS

WO WO-2009102823 8/2009

OTHER PUBLICATIONS

"PCT Application No. PCT/US09/33845 International Preliminary Report on Patentability", Feb. 24, 2010 , 16 pages.
"PCT Application No. PCT/US09/33845 International Search Report", Apr. 6, 2009 , 8 pages.

*Primary Examiner* — Damon Pierce
(74) *Attorney, Agent, or Firm* — DeLizio Gilliam, PLLC

(57) ABSTRACT

Described herein are processes and devices that utilize non-volatile memory on a wagering game machine. One of the devices described is a wagering game system. The wagering game system can receive a request to activate a first wagering game on a wagering game machine, receive critical data for the first wagering game and store the critical data to a fixed-size block within a non-volatile memory store so that the non-volatile memory store includes critical data for only that wagering game. The wagering game system can then copy the critical data for the wagering game to a backing store, verify that the copied critical data on the backing store matches the critical data in the non-volatile memory, activate the first wagering game, present results for the wagering game, and update the backing store with changes made to the critical data on the non-volatile memory store during a game session.

22 Claims, 10 Drawing Sheets

PROCESSING CRITICAL DATA SETS IN NON-VOLATILE MEMORY

RELATED APPLICATIONS

This application claims the priority benefit of U.S. Provisional Application Ser. No. 61/028,370 filed Feb. 13, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

TECHNICAL FIELD

Embodiments of the inventive subject matter relate generally to wagering game systems, and more particularly to devices and processes that utilize non-volatile memory on a game wagering game machine capable of processing multiple wagering game themes in wagering game systems and networks.

BACKGROUND

During normal operation, wagering game machines generate and process data necessary for determining wagering game results, payouts, system integrity, etc. Because wagering game machines need certain data to function properly, wagering game regulators typically have strict rules about how wagering game machines store critical wager gaming data (hereinafter referred to as "critical data"). Some regulators require that wagering game machines store their critical data in non-volatile semiconductor memory devices because these devices are typically less prone to data loss associated with power loss. As a result, wagering game manufacturers have developed wagering game machines that utilize non-volatile memory devices (e.g., non-volatile random access memory, "NVRAM") on the wagering game machines. However, non-volatile memory devices are costly, limited in size, and tend to reduce the life expectancy of batteries as size increases. As wagering game machines have become capable of presenting multiple wagering game themes and/or denominations, the number of wagering game possibilities for a single machine has increased, and continues to increase. Thus wagering game manufacturers are facing challenges of using more costly non-volatile memory to store critical data for all those game possibilities.

SUMMARY

In some embodiments, a method comprises receiving a request to activate a first wagering game on a wagering game machine; receiving critical data for the first wagering game; storing the critical data to a fixed-size block within a non-volatile memory store so that the non-volatile memory store includes critical data for only the first wagering game; copying the critical data for the first wagering game to a backing store, resulting in a first critical data set copy on the backing store; verifying that the first critical data set copy on the backing store matches the critical data in the non-volatile memory; activating the first wagering game; presenting results for the first wagering game; and updating the backing store with changes made to the critical data on the non-volatile memory store for the first wagering game.

In some embodiments, the wagering game machine is capable of activating multiple wagering games each with differing critical data.

In some embodiments, the storing comprises storing the critical wagering game data starting at a fixed memory address in the non-volatile memory store.

In some embodiments, copying the critical data comprises copying the entire fixed-size block within the non-volatile memory store, starting at the fixed memory address, to a backing-store memory address, verifying the integrity of the critical data, and recording the backing-store memory address.

In some embodiments, storing comprises overwriting all critical data for another wagering game that was previously stored on the non-volatile memory store.

In some embodiments, the method further comprises receiving a request to activate a second wagering game; determining a second critical data set copy on the backing store containing critical data for a previously played wagering game with a matching game theme and wager denomination value; and overwriting all of the critical data in the non-volatile memory store with the second critical data set copy on the backing store by overwriting a portion of the non-volatile memory store starting at a fixed memory address within the non-volatile memory store; and verifying the integrity of the second critical data set copy within the non-volatile memory store.

In some embodiments, the critical data set copy comprises a fixed data size equivalent to the fixed data size in the non-volatile memory store.

In some embodiments, the method further comprises detecting an unexpected power loss while copying the critical data for the first wagering game to a backing store; verifying that the critical data on the non-volatile memory store and the critical data copied to the backing store are equivalent; and recopying the critical data to the backing store when the critical data is not equivalent on the non-volatile memory store and the backing store.

In some embodiments, a system comprises a backing store configured to store critical data copies for a plurality of wagering games; and a wagering game machine configured to receive a request to activate a first wagering game on a wagering game machine, the wagering game machine comprises; a game control module configured to receive critical data for the first wagering game; a non-volatile random access memory configured to store critical data for only active wagering games, wherein the non-volatile random access memory is configured to store the critical data for the first wagering game within a fixed-size area, the fixed-size area to include critical data for only the first wagering game; and a game data processor configured to copy the critical data for the first wagering game to the backing store; activate the first wagering game; and update the backing store with changes made to the critical data for the first wagering game on the non-volatile memory store.

In some embodiments, critical data for the first wagering game comprises any one or more of wager denomination values, game play outcomes, game meters, and player account transactions for the first wagering game.

In some embodiments, said storing comprises storing the critical data for the first wagering game starting at a fixed memory address in the non-volatile random access memory.

In some embodiments, copying the critical data for the first wagering game comprises copying the entire fixed-size area within the non-volatile random access memory, starting at the fixed memory address, to a backing-store memory address, and wherein the wagering game machine further comprises a memory location store configured to record the backing-store memory address.

In some embodiments, storing comprises overwriting any critical data for any other wagering game that was previously stored on the non-volatile random access memory.

In some embodiments, the wagering game machine is further configured to receive a request to activate a second wagering game, determine a critical data set copy on the backing store containing critical data for a previously played wagering game with data requirements matching the second wagering game for any one or more of a game theme and a game denomination, and overwrite all of the critical data for the first wagering game in the non-volatile random access memory with the critical data set copy on the backing store by overwriting the critical data set copy starting at a fixed memory address within the non-volatile random access memory.

In some embodiments, the critical data set copy comprises a fixed data size equivalent to the fixed-size area in the non-volatile random access memory.

In some embodiments, the wagering game machine is further configured to detect an unexpected power loss while copying the critical data for the first wagering game to a backing store, verify that the critical data on the non-volatile memory store and the critical data copied to the backing store are equivalent, and recopy the critical data to the backing store when the critical data is not equivalent on the non-volatile memory store and the backing store.

In some embodiments, one or more machine-readable media having instructions stored thereon, which when executed by a set of one or more processors causes the set of one or more processors to perform operations that comprise receiving critical data for a first wagering game; storing the critical data within a fixed memory address block of a wagering game machine's non-volatile memory store so that the non-volatile memory store includes critical data for only the first wagering game, wherein the storing comprises storing the critical wagering game data starting at a fixed memory address at the beginning of the fixed memory address block and overwriting critical data, within the fixed memory address block, for all other wagering games that were previously stored on the non-volatile memory store; and copying the critical data for the first wagering game to a backing store, wherein copying comprises copying the entire fixed memory address block within the non-volatile memory store, starting at the fixed memory address, to a backing-store memory address.

In some embodiments, the wagering game machine is capable of processing content for multiple wagering games, with differing wagering game content.

In some embodiments, the machine-readable media further comprises receiving a request to activate a second wagering game; determining a critical data set copy on the backing store containing critical data for a previously played wagering game with a matching game theme and game denomination; and overwriting all of the critical data in the non-volatile memory store with the critical data set copy on the backing store by overwriting the critical data set copy to a pre-determined memory address within the non-volatile memory store.

In some embodiments, the machine-readable media further comprises updating the backing store with changes made to the critical data on the non-volatile memory store for the first wagering game.

In some embodiments, an apparatus comprises a game control module configured to receive a request to activate a first wagering game on a wagering game machine, the first wagering game having a first game theme and a first wager denomination value; and a game data processor configured to determine a critical data set copy on a backing store containing critical data for a second wagering game previously played on the wagering game machine, the second wagering game having any one or more of a second game theme matching the first theme and a second wager denomination value matching the first wager denomination value, and overwriting a fixed-size block within the non-volatile memory store with the critical data set copy on the backing store starting at a fixed memory address at the beginning of the fixed-sized block.

In some embodiments, the non-volatile memory store contains critical data for a third wagering game that had most recently been played on the wagering game machine, and wherein overwriting the fixed-size block comprises overwriting all of the critical data for the third wagering game within the fixed-size block with the critical data set copy.

In some embodiments, a wagering game machine, comprises a means for storing critical data for a single wagering game at a time within a fixed-size area in a non-volatile memory store; a means for receiving a request to activate a first wagering game on the wagering game machine, the first wagering game having a first wager denomination value; a means for a determining a first critical data set copy on a backing store containing critical data for a second wagering game previously played on the wagering game machine, the second wagering game having a second wager denomination value matching the first wager denomination value; and a means for overwriting a fixed-size block within the non-volatile memory store with the first critical data set copy on the backing store starting at a fixed memory address at the beginning of the fixed-sized block.

In some embodiments, the wagering game machine further comprises a means for presenting the first wagering game on the wagering game machine to be played; a means for updating the fixed-size block within the non-volatile memory store with updated critical data for the first wagering game; a means for copying the fixed-size block of critical data for the first wagering game to a backing store, resulting in a second critical data set copy on the backing store; and verifying that the second critical data set copy on the backing store matches the critical data in the non-volatile memory.

In some embodiments, the critical data comprises any one or more of game meters and game history.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into four sections. The first section provides an introduction to embodiments. The second section describes example operations performed by some embodiments while the third section describes example operating environments. The fourth section presents some general comments.

Introduction

This section provides an introduction to some embodiments.

Some embodiments of the invention enable wagering game systems to swap sets of critical data in and out of a non-volatile memory as games themes and/or denominations (i.e., wager values) change on a wagering game machine. Thus, some embodiments can minimize the amount of non-volatile memory used within a wagering game machine capable of processing multiple wagering game themes and/or denominations.

Figure 1:
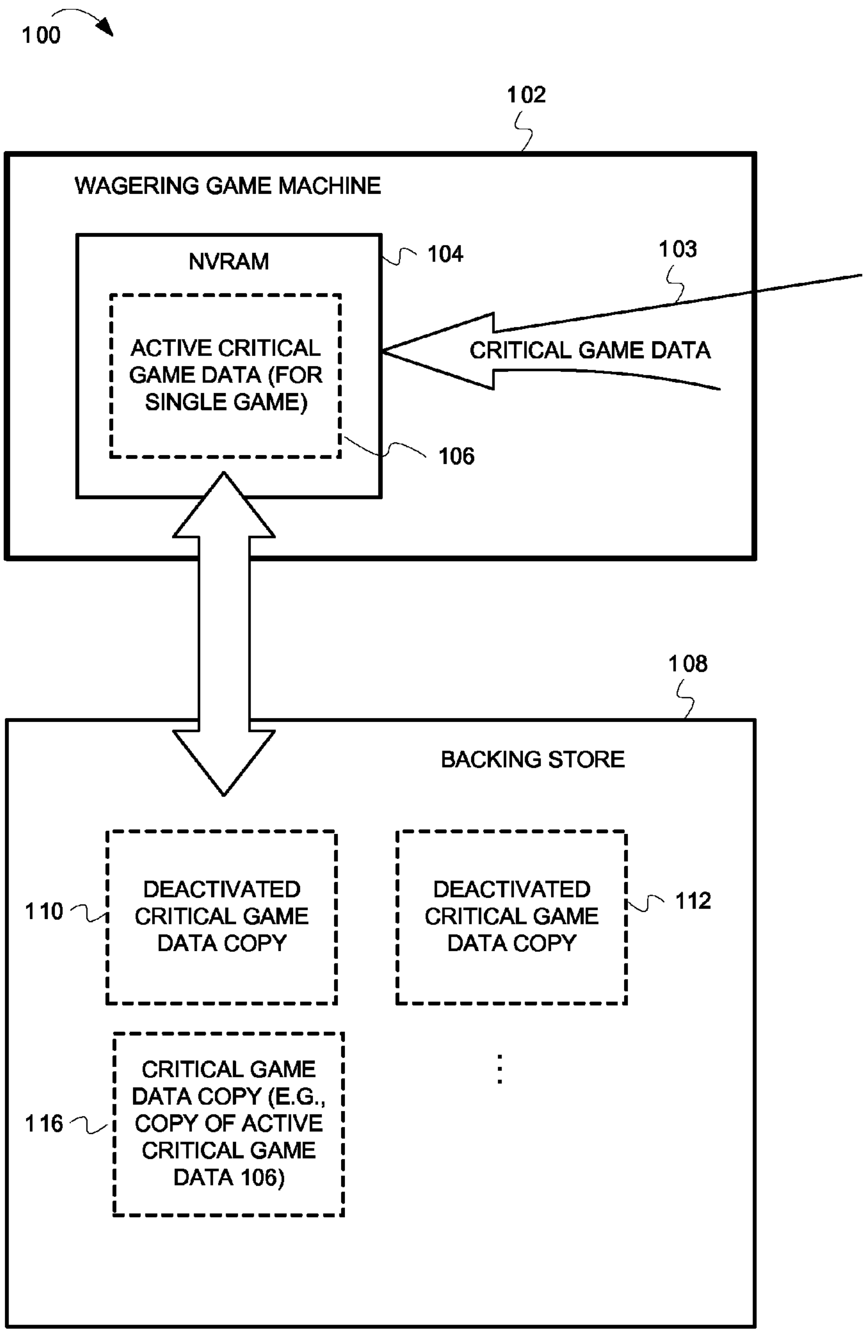
FIG. 1 is an illustration of utilizing non-volatile memory as a write-through cache for one wagering game at a time, according to some embodiments.

FIG. 1 is a conceptual diagram that illustrates an example of utilizing non-volatile memory to store critical data for one wagering game at a time on a multi-wagering game capable machine, according to some embodiments. In FIG. 1, a wagering game system ("system") 100 includes a wagering game machine 102. The wagering game machine 102 includes a non-volatile random access memory (NVRAM) 104. The NVRAM 104 can be a high-speed memory device that can be used to store data in a way that protects the data from unexpected power failures. The wagering game machine can utilize the NVRAM 104 for storing critical data 103, such as game meters, game history, etc. The wagering game machine 102 can receive and use the critical data 103 from data sources and devices both internal and external to the wagering game machine 102. The NVRAM 104 stores a critical data set 106 for a single wagering game at a time. For instance, a "single" wagering game may be a combination of a specific game theme and denomination, resulting in a difference in game metering. Game metering relates, in part, to what the critical data consists of, how it is tracked, and where it is stored. For example, specific critical data variables, parameters, etc. may change in sizes, types, etc. for different wagering games and consequently may have a different data structure, memory address, etc. within NVRAM. For example, a wagering game player may request that a game theme be loaded into a wagering game machine for a certain game denomination (e.g., the "Reel 'Em In" game at a $1 denomination.) The game meters (e.g., programming variables, parameters, etc.) for the game theme, at that denomination, are consistent regardless of how long that player plays that single game theme/denomination combination. The player may play that single game for several game plays and the wagering game machine may write critical data to the exact same memory addresses in NVRAM, using the same parameters, the same code, etc. However, the player may want to increase the denomination value for the same game theme (e.g., the player requests "Reel 'Em In" at a $5 denomination). Thus, although the game theme hasn't changed, the denomination value has changed, and the wagering game meter values, structure, etc. change. The second combination of game theme and combination, therefore, could constitute a second wagering game.

Because the wagering game machine usually only presents a single wagering game at once (e.g., present one game session for any given theme and/or denomination on the wagering game machine's screen at any given time), the NVRAM 104 only needs to store critical data for that single game. However, in some embodiments, a wagering game may process more than one game at a time. For example, a wagering game machine may be docked at a docking station having two or more display screens. The wagering game machine may process two independent wagering games simultaneously and display the independent wagering games on the two display screens. Thus, where the wagering game machine processes independent wagering games simultaneously, the wagering game machine can have segregated portions of NVRAM with space to store critical data for the respective games. Alternatively, wagering game machine may contain separate NVRAM devices for the separate games. For clarity, however, many of the embodiments herein will be described with a single NVRAM for only a single wagering game. The single wagering game with its critical data in the NVRAM 104 will be referred to herein as the "active" wagering game, or the wagering game that is currently being displayed and played on the wagering game machine 102. The critical data for the single "active" wagering game can be termed a critical data "set". When a different wagering game (e.g., theme/denomination combination) is requested, the active game can be "deactivated", by backing up the NVRAM 104 and swapping the critical data set 106 in NVRAM 104 with a critical data set for the requested game. Any wagering game that may have been played on the wagering game machine 102, but that is no longer being played, will be referred to herein as a "deactivated" game. The system 100 stores critical data for deactivated games on a backing store 108. In some embodiments, the critical data sets are a consistent size for all wagering games. By making the critical data set 106 a consistent data size, the system 100 can swap critical data sets into and out of the NVRAM 104 (e.g., swap out the critical data set 106 with either of the deactivated critical data set copies 110 & 112, etc.) starting and ending at consistent, fixed memory addresses within the NVRAM 104.

At the start of a wagering game session for an active wagering game, the system 100 can write a copy of the critical data set 106 to a critical data set copy 116 in the backing store 108. During the wagering game data session, the system 100 can update the critical data set 106 in NVRAM 104 and overwrite the critical data set copy 116 with the updated critical data set 106, for instance, after a slot reel spins, after a player adds credits, etc When the wagering game machine 102 receives a request to load a different wagering game ("requested game"), the system 110 deactivates the active wagering game on the wagering game machine 102. The system 100 determines whether the requested game has critical data (e.g., meters, game history, etc.) for a game that has been played recently on the wagering game machine 102. If so, the system 100 determines whether a critical data copy for the requested game has been stored on the backing store 108 (e.g., determines whether the requested game correlates to previous game data copies 110, 112, etc., stored from a previous game session having a matching game theme and/or denomination as the requested game.) If the backing store 108 has a stored critical data set copy (e.g., 110) correlating to the requested wagering game, then the wagering game system 100 loads the contents of the stored critical data set copy 110 into the NVRAM 104, overwriting the critical data set 106 on the NVRAM 104. The stored critical data set copy 110 is the same size as the critical data set 106 on the NVRAM 104. Consequently, the system 100 can overwrite the NVRAM 104 with the stored critical data set copy 110 by writing the stored critical data set copy 110, starting from a consistent, fixed memory address within the NVRAM 104, and completely overwriting any critical data already on the NVRAM 104.

Although FIG. 1 describes some embodiments, the following sections describe many other features and embodiments.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 2:
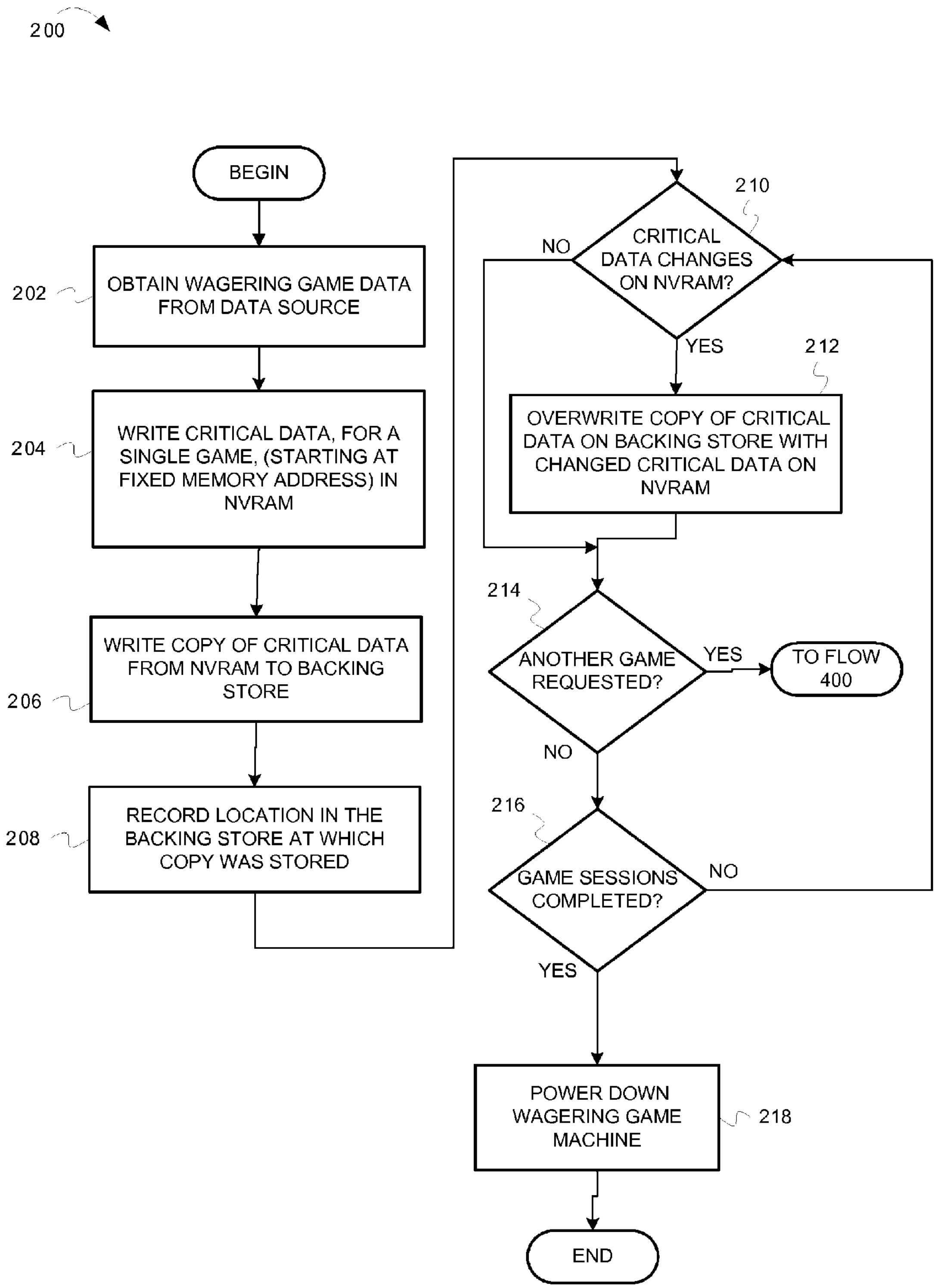
FIG. 2 is a flow diagram 200 illustrating utilizing non-volatile memory to store critical game data for a single wagering game in a multi-wagering game environment, according to some embodiments.
Figure 3:
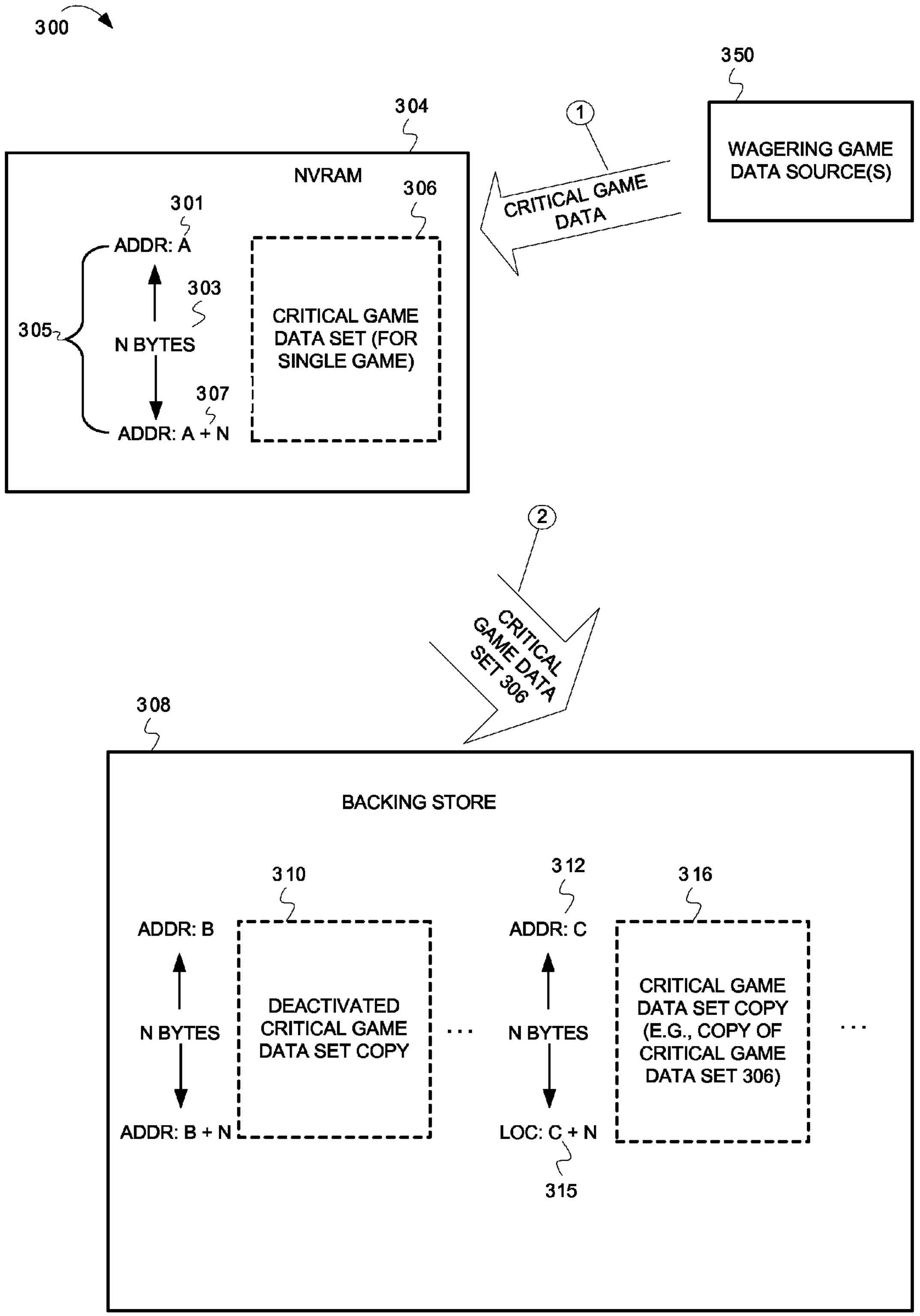
FIG. 3 is an illustration of storing critical data, in a non-volatile memory store, for a single wagering game at a time and copying the critical data to a backing store, according to some embodiments.

FIG. 2 is a flow diagram illustrating utilizing non-volatile memory to store critical game data for a single wagering game in a multi-wagering game environment, according to some embodiments. FIG. 3 is a conceptual diagram that helps illustrate the flow of FIG. 2. This description will present FIG. 2 in concert with FIG. 3. In FIG. 2, a flow 200 begins at processing block 202, where a wagering game system ("system") obtains wagering game data from a data source. A wagering game data source can include devices external to a wagering game machine, such as wagering game servers, progressive servers, account servers, etc. A wagering game data source, however, can also be a device(s) internal to the wagering game machine, such as a hard drive, a processor, etc. A wagering game player may want to play a game on the wagering game machine, and therefore, requests that a game be loaded onto the wagering game machine. The wagering game machine can communicate with the data source, such as a wagering game server, to obtain both non-critical data (e.g. game content, like game graphics, audio, etc.; game code; game control commands; etc.) and critical data. The wagering game machine can store the non-critical data into various memory storage devices on the wagering game machine that are not power tolerant, or "volatile" memory devices. For example, the wagering game machine may load the non-critical data onto a hard-disk and/or random access memory (RAM). However, the wagering game machine, according to regulations, may be required to store the critical data, such as denomination values, meter information, player account information, etc., into a non-volatile memory device, like NVRAM, to track the critical data for the game session. The NVRAM keeps the critical data safe from being erased by unexpected power losses.

The flow 200 continues at processing block 204, where the system writes critical data for a single wagering game into NVRAM. The system can write critical data, using a fixed memory address within NVRAM. The fixed address can be a pre-determined or dynamically identified memory address within the NVRAM. For example, in FIG. 3, a wagering game system ("system") 300 writes critical data from the wagering game data source(s) 350 to an NVRAM 304. The NVRAM 304 includes a memory address block 305, ranging from a "fixed" starting memory address 301 to an ending memory address 307. The memory address block 305 can be the addresses allocated for the critical game data and it can be a consistent size for all wagering games (e.g., N-bytes, where the "N" represents a number of bytes needed to store critical data for only one wagering game at a time). The starting memory address 301 can be any suitable memory address (e.g., Address A—see 301) within the NVRAM 304 (i.e., it does not necessarily have to be the first memory address in the NVRAM 304). The block size 305 can represent a portion of total data capacity of the NVRAM 304. After the fixed memory address 301 is determined, the system 300 can store it and utilize it to write a single wagering game's critical data into a critical data set 306. According to some embodiments, the system 300 stores, in the memory address block 305, critical data for only a single wagering game, and limits critical data storage size to the data block size 303.

The flow 200 continues at processing block 206, where the system writes a copy of critical data from NVRAM to a backing store. The system stores a copy of the critical data for the active wagering game so that, when a player requests another wagering game on the wagering game machine, the wagering game machine can replace the active critical data within the NVRAM with critical data for the another wagering game. The system writes a copy of the entire critical data set within NVRAM to the backing store. In FIG. 3, for example, the system 300 writes the entire contents of NVRAM 304, starting from the fixed memory address 301 to the end memory address 307, to the memory location in a backing store 308, starting from memory address 312 through memory address 315. The system 300 can verify that all of the critical data within the critical data set 306 has been written properly to the backing store 308 with a redundancy check function (e.g., check-sum, cyclic redundancy check, etc.), or another data verification function. The system 300 verifies that the amount of data written from the NVRAM 304 is equivalent to the data block size 303. The backing store 308 may also include previously written copies (e.g., deactivated critical data set copy 310) of critical data sets for wagering games that were played on the wagering game machine, but that were deactivated.

The flow 200 continues at processing block 208, where the system records the location in the backing store at which the copy was stored. The system stores the location in the backing store so that the wagering game machine can know where to update the copy with updated critical data. Also, the system may want to reload the back-up copy at some later point into NVRAM, such as when a player requests the wagering game again (e.g., the same game theme and denomination) after having replaced it with a different wagering game (e.g., a different game theme and/or denomination). For example, in FIG. 3, the system 300 stores memory addresses 312 to 315. The system can store the backing store memory addresses in NVRAM, dynamic RAM, hard disk, or any other memory storage device. The system can then use the memory addresses to overwrite the critical data during subsequent processing (e.g., at processing block 212, or to access the critical data to re-load it into NVRAM, such as at block 420 of flow 400). Further, the second copy on the backing store acts as a back-up to the data in NVRAM, enhancing the power tolerance of the system.

The flow 200 continues at processing block 210, where the system determines whether the critical data changes on the NVRAM. During a wagering game session, the wagering game machine can update critical data on the NVRAM for the single wagering game (e.g., when a slot reel achieves a spin outcome, when a player places a wager or wins a game, when a player cashes out, etc.). Consequently, the critical data on the NVRAM will be a newer version of critical data, and the copy of the critical data set stored on the backing store will be outdated. The system, therefore, can update the copy of the critical data with the updated critical data in the NVRAM. If the critical data changes on the NVRAM, then the process continues at block 212. If the critical data does not change on the NVRAM, then the process continues at block 214.

The flow 200 continues at processing block 212, where the system overwrites the copy of critical data on the backing store with the changed critical data on the NVRAM. Using a similar process described at block 208, the system can write a fresh copy of the updated critical data on the NVRAM to the memory location on the backing store where the critical data was previously stored. For example, in FIG. 3, the system 300 can overwrite a critical data set copy 316 with the critical data set 306 in the NVRAM 304. In some embodiments, the system 300 can write the entire critical data set 306 to the starting memory address 312, overwriting the entire critical data set copy 316 with the current data in the critical data set 306. In other examples, the system 300 can overwrite only updated data from the critical data set 306 to a correlating memory address in the backing store 308 anywhere within the first memory address 312 to the end memory address 315.

The flow 200 continues at processing block 214, where the system determines whether another wagering game is requested for use on the wagering game machine. The wagering game machine can process content from multiple wagering games. The wagering game machine can load games with different themes, denominations, graphics, etc. Some wagering game regulations may require that the wagering game machine keep track of critical data for a certain number of game play sessions. If another wagering game is requested on the wagering game machine, the system may want to store the critical data for the current game for some time while other games are played on the wagering game machine. Therefore, if another wagering game is requested, the system continues with a process to back-up the critical data on the NVRAM, deactivate the wagering game on the wagering game machine, and overwrite critical data on the NVRAM for the requested wagering game. If another game is requested, then the process continues at flow 400, block 402. If another game is not requested, then the process continues at block 216.

The flow 200 continues at processing block 216, where the system determines whether the game session is complete. For example, the wagering game machine may receive a request to end a wagering game session (e.g., to cash-out, to log off, to power-down, etc.) If the game session is not complete, then the process returns to block 210. If the wagering game session is completed, and the critical data has been backed up on the backing store, then the flow 200 can continue at processing block 218.

The flow 200 continues at processing block 218, where the system powers down the wagering game machine. Because the active wagering game's critical data has been backed up on the backing store and no other wagering games are to be played on the wagering game machine before powering down, the system can power down the wagering game machine. In some embodiments, where the backing store is on a secure network, external to wagering game machine, the contents of the wagering game machine's NVRAM can be stored on network backing store, then copied to an array of redundant memory stores, to a tape back-up, or other back-up storage devices.

Figure 4:
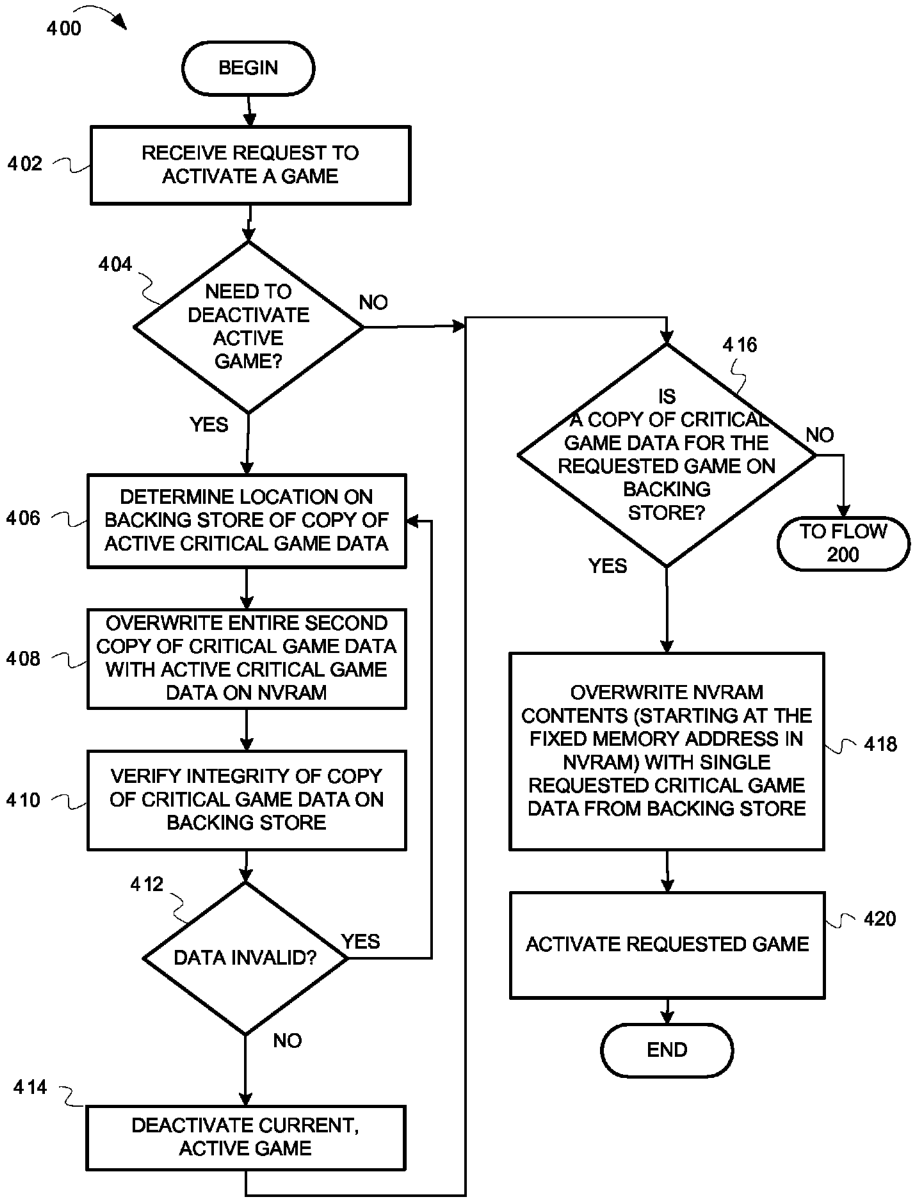
FIG. 4 is a flow diagram 400 illustrating activating and deactivating critical data, in a non-volatile memory store, for a single wagering game at a time, according to some embodiments.
Figure 5:
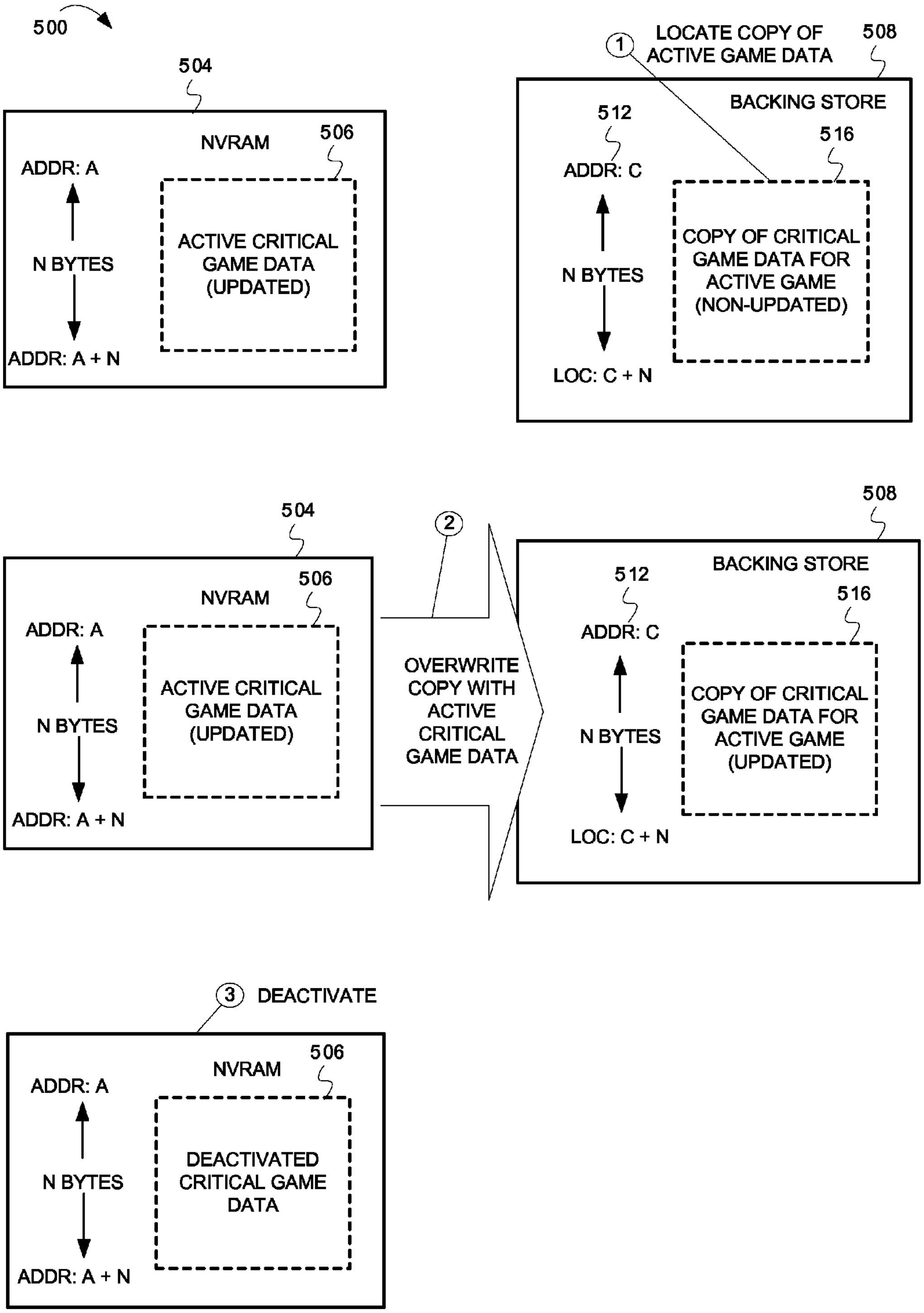
FIG. 5 is an illustration of deactivating critical data, in a non-volatile memory store, for a wagering game, according to some embodiments.
Figure 6:
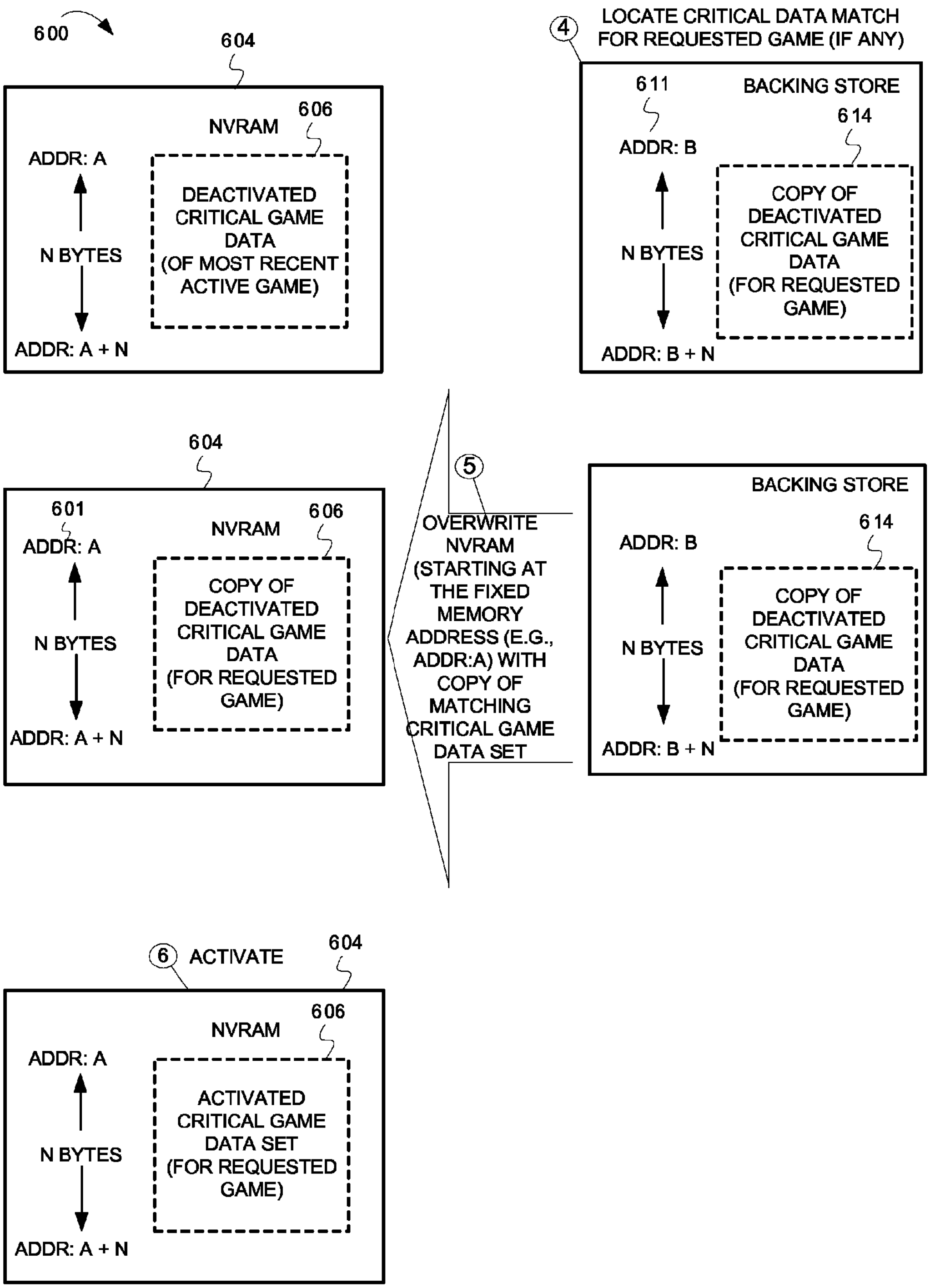
FIG. 6 is an illustration of activating critical data, in a non-volatile memory store, for a wagering game, according to some embodiments.

FIG. 4 is a flow diagram illustrating activating and deactivating critical data, in a non-volatile memory store, for a single wagering game at a time, according to some embodiments. FIGS. 5 and 6 are conceptual diagrams that help illustrate deactivating and activating critical data, respectively. This description will present FIG. 4 in concert with FIGS. 5 and 6. In FIG. 4, a flow 400 begins at processing block 402, where a system receives a request to activate a wagering game on a wagering game machine. For example, a player may request a wagering game with a specific theme and denomination (e.g., the "Reel 'Em In" game at a $5 denomination.) The player can request the wagering game by selecting it from a list of wagering games presented on the wagering game machine's display screen.

The flow 400 continues at processing block 404, where the system determines whether a wagering game on the wagering game device needs to be deactivated. For example, before requesting the wagering game at block 402, a player may have been playing a wagering game with a different theme and/or denomination (e.g., the "Men in Black" game, or the "Reel 'Em In" game at a $1 denomination.) The game that the player was playing is the "active" game on the wagering game machine. However, when the player requested a different game theme and/or denomination value the wagering game machine determines that critical data for the newly requested game theme and/or denomination may need to be tracked differently (e.g., specific critical data variables, parameters, etc., may change in size, type, function, etc.), and consequently may have a different data structure, memory address, etc. within NVRAM. Thus, if the critical data needs to be tracked differently, then the wagering game machine determines that the active critical game data set, for the game that was most recently being played on the wagering game machine, needs to be deactivated, and replaced with a different critical data set for the newly requested game. Thus, the system needs to deactivate the active wagering game, whose critical data is in the NVRAM. If a wagering game needs deactivation, then the process continues at block 406. If not, then the process continues at block 416.

The flow 400 continues at processing block 406, where the system determines the location on the backing store of a critical game data set copy for the active game. The backing store includes a copy of the critical data (e.g., written at stage 206 and subsequently updated at 212) for the active wagering game. As an example, in FIG. 5, a wagering game system ("system") 500 includes a backing store 508 with a critical data set copy 516 for the active wagering game. The critical game data set copy 516 contains a previous, or "non-updated", version of critical data; whereas the NVRAM 504 contains "updated" critical game data 506 for the active game. The system 500 determines the memory address 512 of the critical data set copy 516 (e.g., ADDR: C) within the backing store 508.

The flow 400 continues at processing block 408, where the system overwrites the entire critical data set copy with the active critical data set on NVRAM. For example, in FIG. 5, the system 500 writes the entire critical data set 506 of updated, active critical data to the backing store 508, starting at memory address 512.

The flow 400 continues at processing block 410, where the system verifies the integrity of the critical data set copy on the backing store. At processing block 412, if the system determines that the data is invalid, then the system returns to block 406. If, however, the data is not invalid, then the flow continues at processing block 414.

During the transfer of critical data to the backing store, the wagering game machine may experience an unexpected power loss. If so, the wagering game machine fails to complete the writing process, leaving the previous version of the critical data set copy on the backing store intact, without being overwritten. The system can then restore power to the wagering game machine and verify the integrity of the data in the NVRAM. If the critical data on the NVRAM is invalid, then the process can indicate an integrity error message. Otherwise, the flow can return to processing block 406.

The flow 400 continues at processing block 414, where the system deactivates the current, active wagering game. The system can deactivate the current game by preventing the wagering game machine from writing additional critical data to the NVRAM. The system can also deactivate processes and functions that control wagering game content for the active wagering game.

The flow 400 continues at processing block 416, where the system begins performing operations for loading critical data into NVRAM. In particular, the system determines whether a copy of critical game data for the requested game is on the backing store. The system can check the backing store to determine if any previous copies of critical data exist on the backing store for previously played wagering games that match the requested game. Previously played wagering games can match, for example, if they have a matching game theme and wager denomination value. Some of the previous critical data may include game meters, game denominations, game outcome histories, wagers, etc. The system can use some of the critical data on the backing store, such as previous meter data, during the requested game (though the system may not necessarily use other previous critical data, such as game history). In some embodiments, the system can check that the backing store contains critical data for a wagering game played on another wagering game machine. For instance, if a wagering game machine became non-functional, a player may have to obtain a new wagering game machine on which to resume an unfinished game or to otherwise continue game play. The system can then check a network backing store that might contain a copy of the critical data from the previous wagering game machine. In FIG. 6, a wagering game system ("system") 600 determines that a copy of critical data 614 exists on the backing store 608 for a previous, deactivated game session. The system 600 can determine the location of the critical data copy 614 by accessing a record the memory address 611 (e.g., recorded at block 208 in flow 200), representing the beginning memory address for the critical data set copy 614.

The flow 400 continues at processing block 418, where the system overwrites the NVRAM contents, starting at the fixed memory address in NVRAM, with the single requested critical data set copy from the backing store. For example, in FIG. 6, the system 600 can overwrite the deactivated critical data set 606 in NVRAM 604 with the entire contents of the critical data set copy 614. The system 600 can determine a fixed memory address 601 for the designated portion of the NVRAM 604 for critical data storage. The system 600 can utilize the fixed memory address 601 as a starting point for overwriting. The critical data set copy 614 is an exact data size (i.e., N bytes) of critical data. Thus, when the system overwrites the critical data set 606 with the critical data set copy 614, the system 600 can do so without having to dynamically erase data from the NVRAM 604. Instead, the system 600 can overwrite the block of critical data 606 entirely just by starting the data writing process at the starting memory address 601. After the system 600 overwrites the NVRAM 604, starting at the fixed memory address 601, the system 600 can verify the integrity of the data written to the NVRAM 604. If the data is invalid, the system 600 can repeat the processing block 418.

The flow 400 continues at processing block 420, where the system activates the requested game on the wagering game machine. The system can activate the requested game by loading game content and control information into the wagering game machine and enabling the wagering game machine to begin updating the NVRAM with updated critical data. For example, in FIG. 6, the critical data set 606 becomes active critical data. The system 600 can utilize any useful active critical data in the NVRAM 604 when loading game content and control information, for determining game functionality, and/or for controlling the requested, now active, wagering game. The system can also proceed to update the NVRAM 604 with some new critical data, such as overwriting non-useful game history with new game history. The system 600 can follow a flow similar to flow 200, starting at block 210.

Additional Example Operating Environments

This section describes example operating environments, systems and networks, and presents structural aspects of some embodiments.

Example Wagering Game System Architecture

Figure 7:
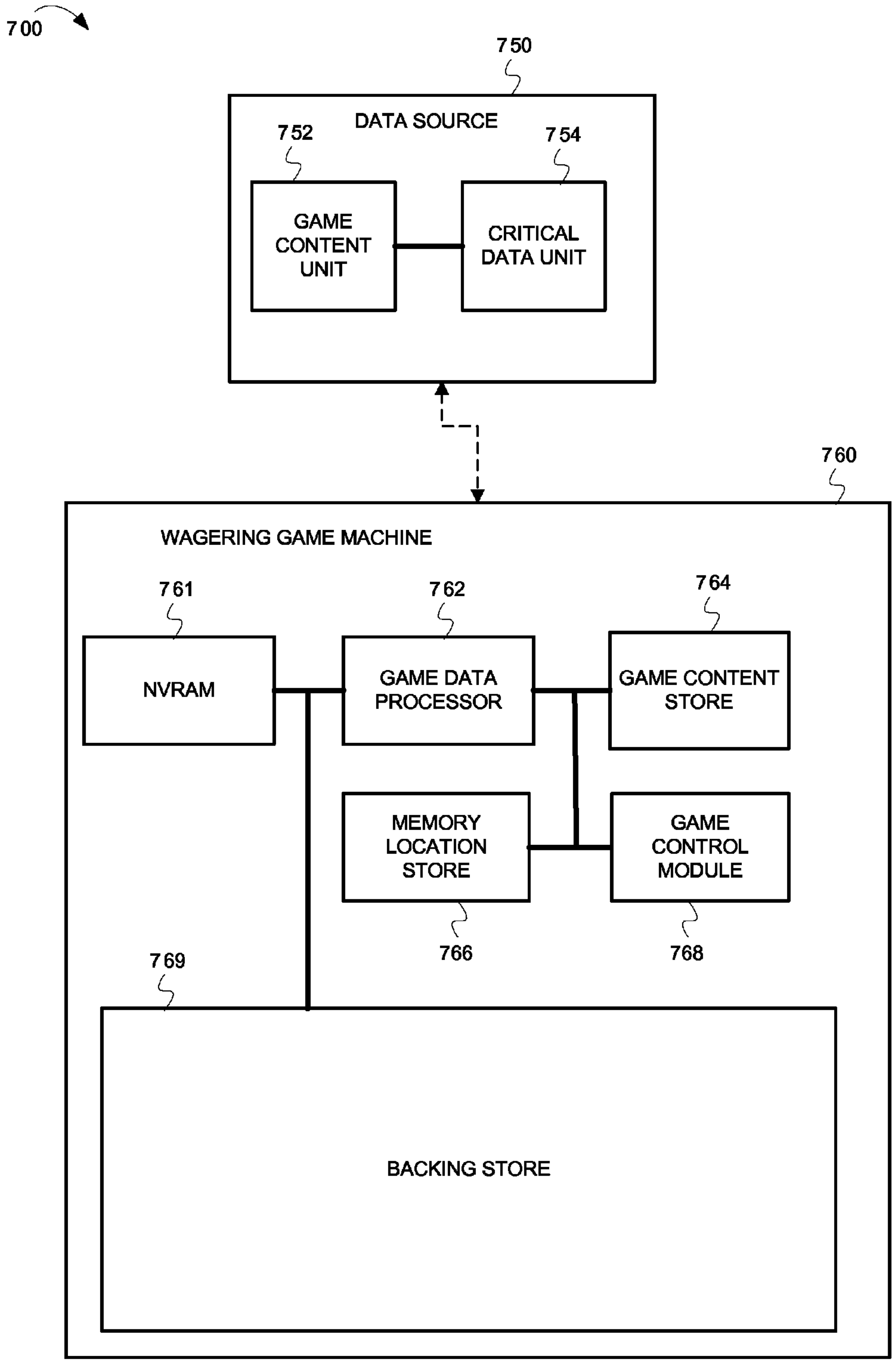
FIG. 7 is an illustration of a wagering game system architecture 700, according to some embodiments.

FIG. 7 is a conceptual diagram that illustrates an example of a wagering game system architecture 700, according to some embodiments. The wagering game system architecture 700 can include a data source 750 configured to provide wagering game content and critical data for wagering games. The data source 750 can include a game content unit 752 configured to provide wagering game content and/or control information. Game content can include graphics and sound files, programming files, executables, services, etc. Control information can include information to control wagering game content, such as random numbers, game outcomes, bonus information, etc. The data source 750 also can include a critical data unit 754 configured to provide critical game data, including information (e.g., game meters, game history, etc.) that can be stored in non-volatile memory (e.g., NVRAM), according to embodiments, for a single wagering game during an active game session.

The wagering game system architecture 700 also can include a wagering game machine 760 configured to present wagering games and receive and transmit information to utilize non-volatile memory on a wagering game machine for a single wagering game at a time. The wagering game machine 760 can include a non-volatile random access memory 761 configured to store critical game data for a single wagering game (and no other wagering games) during a single wagering game session. The wagering game machine 760 also can include a game data processor 762 configured to process information within the wagering game machine. The wagering game machine 760 also can include a game content store 764 configured to receive, store, and/or generate wagering game content (e.g. game graphics, game audio files, etc.). The wagering game machine 760 also can include a memory location store 766 configured to record memory addresses of critical game data sets that are stored on a backing store. In some embodiments, the memory location store 766 can reside within NVRAM 761. The wagering game machine 760 also can include a game control module 768 configured to receive and/or generate control information to control wagering game content. In some embodiments, the game control module 768 can be combined with (e.g., reside within, be replaced by, etc.) the game data processor 762. The wagering game machine 760 also can include a backing store 769 configured to store critical game data for active and deactivated games. In some embodiments the backing store 769 can reside within the wagering game machine 760 (e.g., hard disk), external to the wagering game machine 760 (e.g., network drive), or either internal to or external to the wagering game machine (e.g., USB Flash device, compact flash, etc.).

Each component shown in the wagering game system architecture 700 is shown as a separate and distinct element. However, some functions performed by one component could be performed by other components. For example, the game control module 768 can perform functions that the game data processor 762 can perform, and vice versa. Furthermore, the components shown may all be contained in one device, but some, or all, may be included in, or performed by multiple devices on the systems and networks 722, as in the configurations shown in FIG. 7 or other configurations not shown. Furthermore, the wagering game system architecture 700 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Wagering Game Network

Figure 8:
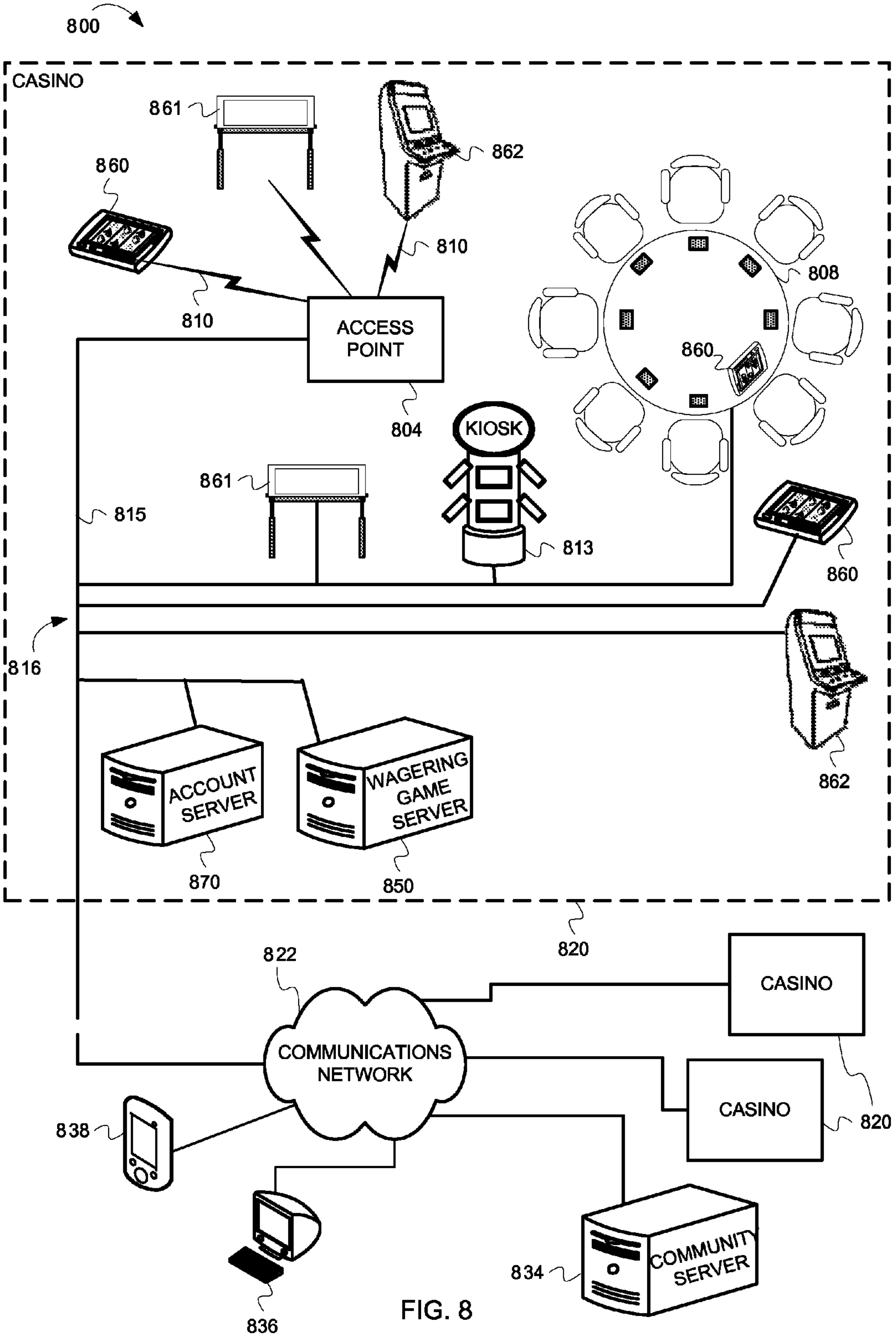
FIG. 8 is an illustration of a wagering game network 800, according to some embodiments.

FIG. 8 is a conceptual diagram that illustrates an example of a wagering game network 800, according to some embodiments. The wagering game network 800 includes example embodiments of the components described vis-à-vis FIG. 7. In FIG. 8, the wagering game network 800 includes a plurality of casinos 820 connected to a communications network 822. Each casino 820 includes a local area network 816, which includes an access point 804, one or more servers 850, 870 and wagering game machines 860, 861, 862. In one embodiment, the local area network 816 may also include specific types of servers, such as wagering game servers, promotions servers, player information servers, management servers, social networking servers, progressive game servers, player tracking servers, file servers, web servers, application servers, database servers, and casino and player account servers. There are many other devices, in other embodiments, that are not shown but that may exist in a wagering game network (e.g., routers, switches, monitoring equipment, etc.). The access point 804 provides wireless communication links 810 with wagering game machines 860, 861, 862. The local area network 816 may also include wired communication links 815 to connect to servers 850, 870, wireless access point 804, wagering game machines 860, 861, 862, one or more docking stations 808 and one or more kiosks 813 for storing mobile machines. The wired and wireless communication links can employ any suitable connection technology, such as Bluetooth, 801.11, Ethernet, public switched telephone networks, SONET, etc. In some embodiments, the servers 850, 870, can serve wagering games and distribute content to devices located in other casinos 820 or at other locations on the communications network 822. In some embodiments, the servers 850, 870, can serve wagering games and distribute content to devices located outside of casinos, such as to a personal computer 836, a hand-held personal digital assistant 838, a community server 818, etc.

The wagering game machines 860, 861, 862 described herein can take any suitable form, such as floor standing models (e.g., 862), handheld mobile units (e.g., 860), bar-top models, workstation-type console models, surface computing machines (e.g., 861), etc. Further, the wagering game machines 860, 861, 862 can be primarily dedicated for use in conducting wagering games, or can include non-dedicated devices, such as mobile phones, personal digital assistants, personal computers, etc.

In some embodiments, the wagering game machines 860, 861, 862 and the wagering game server 850 work together such that wagering game machines 860, 861, 862 can be operated as a thin, thick, or intermediate client. For example, one or more elements of game play may be controlled by the wagering game machines 860, 861, 862 (client) or the wagering game server 850. Game play elements can include executable game code, lookup tables, configuration files, game outcome, audio or visual representations of the game, game assets or the like. In a thin-client example, the wagering game server 850 can perform functions such as determining game outcome or managing assets, while the wagering game machines 860, 861, 862 can present a graphical representation of such outcome or asset modification to the user (e.g., player). In a thick-client example, the wagering game machines 860, 861, 862 can determine game outcomes and communicate the outcomes to the wagering game server 850 for recording or managing a player's account.

In some embodiments, either the wagering game machines 860, 861, 862 (client) or the wagering game server 850 can provide functionality that is not directly related to game play. For example, account transactions and account rules may be managed centrally (e.g., by the wagering game server 850) or locally (e.g., by the wagering game machines 860, 861, 862). Other functionality not directly related to game play may include power management, presentation of advertising, software or firmware updates, system quality or security checks, community management, real-time messaging, etc. The wagering game machines 860, 861, 862 are capable of processing more than one wagering game, or variation of a wagering game. The wagering game machines 860, 861, 862 can utilize non-volatile memory to store a critical data set for a single wagering game at a time. The servers 850, 870, can be data sources to provide critical game data to the wagering game machines 860, 861, 862. The servers 850, 870, or the wagering game machines 860, 861, 862, can include one or more backing stores to store critical data set copies.

The wagering game network 800 may be internal or external to a casino 820 and may interact with any suitable wagering game network component to utilize non-volatile memory on a wagering game machine for a single wagering game at a time. In some embodiments, any one of the components can reside inside any of the other network components (e.g., wagering game server 850, account server 870, wagering game machines 860, 861, 862, etc.)

Example Wagering Game Machine Architecture

Figure 9:
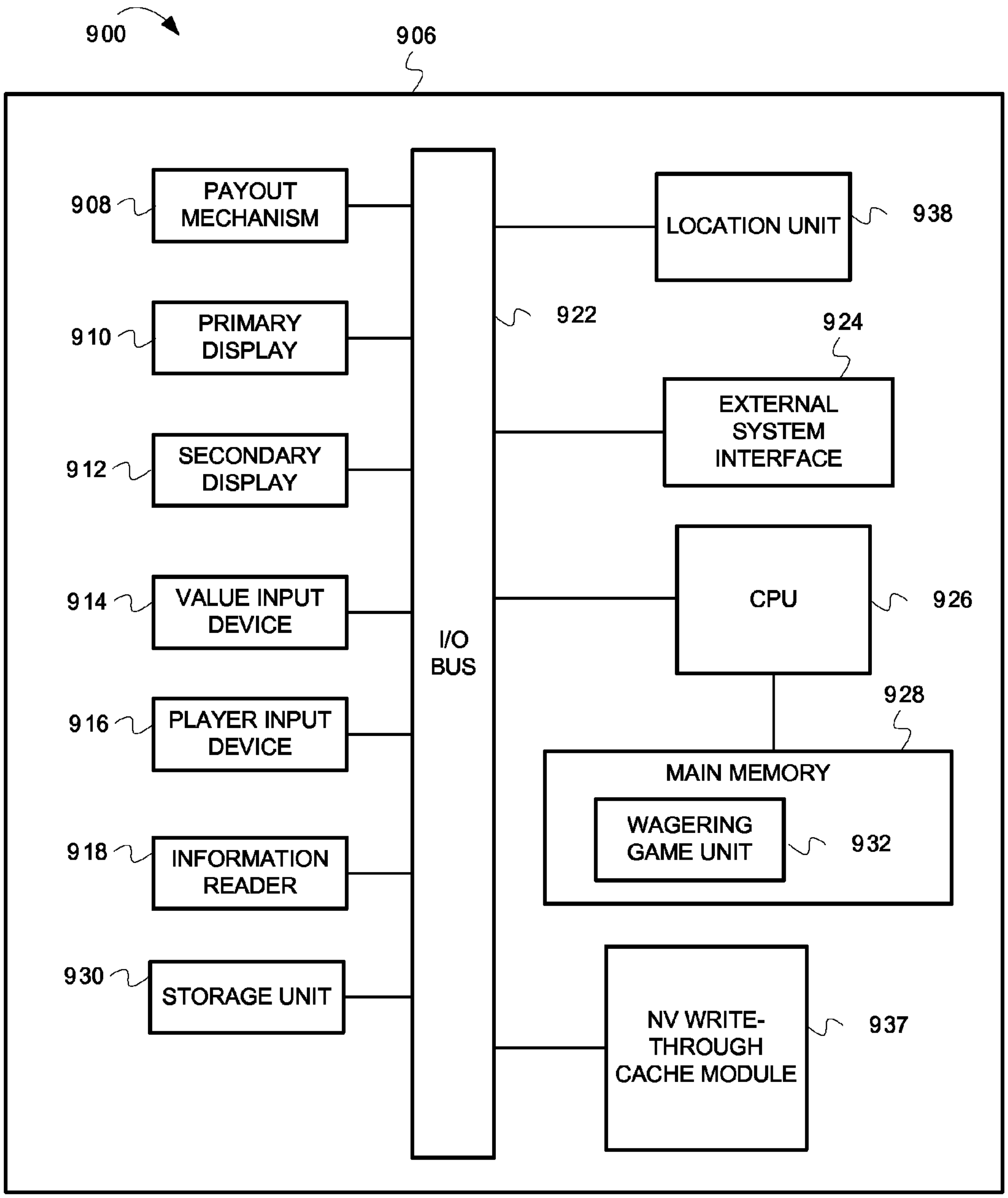
FIG. 9 is an illustration of a wagering game machine architecture 900, according to some embodiments.

FIG. 9 is a conceptual diagram that illustrates an example of a wagering game machine architecture 900, according to some embodiments. In FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In one embodiment, the wagering game unit 932 can present wagering games, such as video poker, video black jack, video slots, video lottery, reel slots, etc., in whole or part.

The CPU 926 is also connected to an input/output ("I/O") bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems 904 (e.g., wagering game networks). The external system interface 924 can include logic for exchanging information over wired and wireless networks (e.g., 802.11g transceiver, Bluetooth transceiver, Ethernet transceiver, etc.)

The I/O bus 922 is also connected to a location unit 938. The location unit 938 can create player information that indicates the wagering game machine's location/movements in a casino. In some embodiments, the location unit 938 includes a global positioning system (GPS) receiver that can determine the wagering game machine's location using GPS satellites. In other embodiments, the location unit 938 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 9, in some embodiments, the location unit 938 is not connected to the I/O bus 922.

In one embodiment, the wagering game machine 906 can include additional peripheral devices and/or more than one of each component shown in FIG. 9. For example, in one embodiment, the wagering game machine 906 can include multiple external system interfaces 924 and/or multiple CPUs 926. In one embodiment, any of the components can be integrated or subdivided.

In one embodiment, the wagering game machine 906 includes a non-volatile memory write through cache module 937. The non-volatile memory write through cache module 937 can process communications, commands, or other information, where the processing can utilize non-volatile memory on a wagering game machine to store a critical data set for a single, active, wagering game at a time. The storage unit 930 can store critical data sets for the active wagering game and for deactivated wagering games within the non-volatile memory Furthermore, any component of the wagering game machine 906 can include hardware, firmware, and/or machine-readable media including instructions for performing the operations described herein.

Example Mobile Wagering Game Machine

Figure 10:
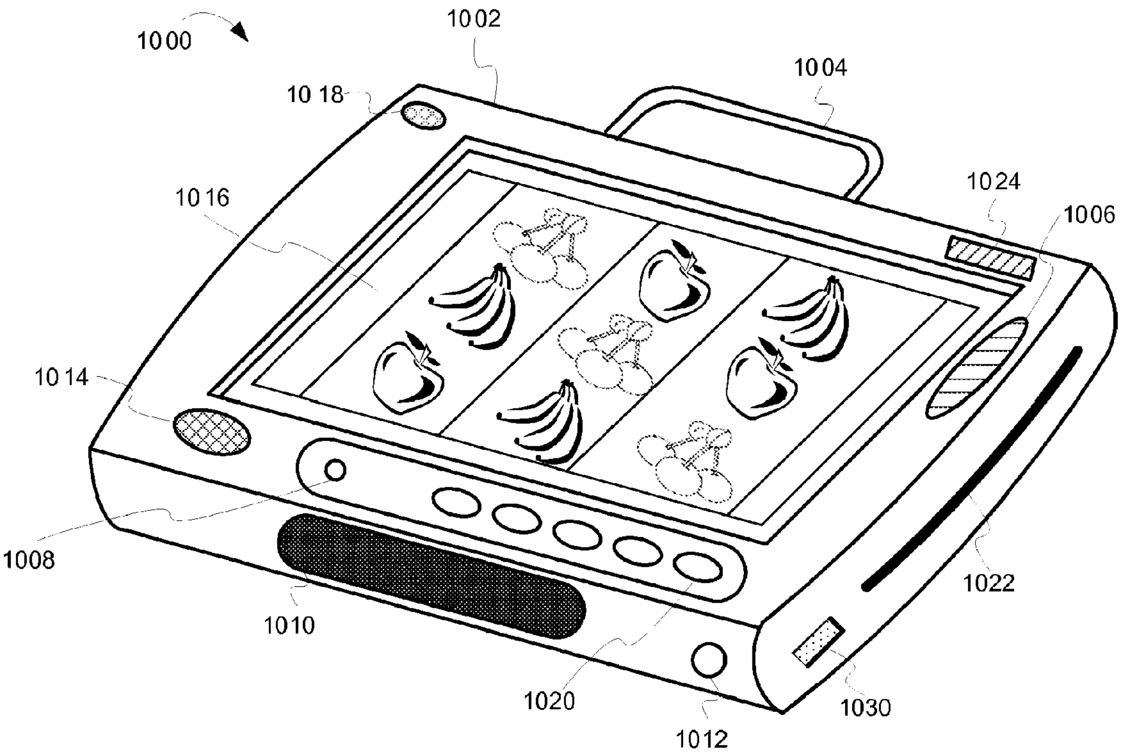
FIG. 10 is an illustration of a mobile wagering game machine 1000, according to some embodiments.

FIG. 10 is a conceptual diagram that illustrates an example of a mobile wagering game machine 1000, according to some embodiments. In FIG. 10, the mobile wagering game machine 1000 includes a housing 1002 for containing internal hardware and/or software such as that described above vis-à-vis FIG. 9. In one embodiment, the housing has a form factor similar to a tablet PC, while other embodiments have different form factors. For example, the mobile wagering game machine 1000 can exhibit smaller form factors, similar to those associated with personal digital assistants. In one embodiment, a handle 1004 is attached to the housing 1002. Additionally, the housing can store a foldout stand 1010, which can hold the mobile wagering game machine 1000 upright or semi-upright on a table or other flat surface.

The mobile wagering game machine 1000 includes several input/output devices. In particular, the mobile wagering game machine 1000 includes buttons 1020, audio jack 1008, speaker 1014, display 1016, biometric device 1006, wireless transmission devices 1012 and 1024, microphone 1018, and card reader 1022. Additionally, the mobile wagering game machine can include tilt, orientation, ambient light, or other environmental sensors.

In one embodiment, the mobile wagering game machine 1000 uses the biometric device 1006 for authenticating players, whereas it uses the display 1016 and speakers 1014 for presenting wagering game results and other information (e.g., credits, progressive jackpots, etc.). The mobile wagering game machine 1000 can also present audio through the audio jack 1008 or through a wireless link such as Bluetooth.

In one embodiment, the wireless communication unit 1012 can include infrared wireless communications technology for receiving wagering game content while docked in a wager gaming station. The wireless communication unit 1024 can include an 802.11G transceiver for connecting to and exchanging information with wireless access points. The wireless communication unit 1024 can include a Bluetooth transceiver for exchanging information with other Bluetooth enabled devices.

In one embodiment, the mobile wagering game machine 1000 is constructed from damage resistant materials, such as polymer plastics. Portions of the mobile wagering game machine 1000 can be constructed from non-porous plastics which exhibit antimicrobial qualities. Also, the mobile wagering game machine 1000 can be liquid resistant for easy cleaning and sanitization.

In some embodiments, the mobile wagering game machine 1000 can also include an input/output ("I/O") port 1030 for connecting directly to another device, such as to a peripheral device, a secondary mobile machine, etc. Furthermore, any component of the mobile wagering game machine 1000 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

detecting a request, via a wagering game machine, to change a denomination of a wagering game from a first denomination value to a second denomination value;

based on the request to change the first denomination value to the second denomination value, determining that a copy of critical data for the wagering game is stored in a backing store for previous states of game play for the wagering game for only the second denomination value, wherein the critical data is to be stored in a non-volatile memory store on the wagering game machine for a given number of game plays when the wagering game is active, and wherein the copy of critical data is of a fixed memory size;

accessing the copy of critical data for the wagering game from the backing store; and overwriting an entire contents of the non-volatile memory store for the wagering game machine with the copy of critical data so that the non-volatile memory store includes only the copy of critical data for only the wagering game, wherein the entire contents of the non-volatile memory store also is of the fixed memory size, wherein the overwriting comprises writing the critical data starting at a fixed memory address in the non-volatile memory store, and wherein the fixed memory address is a starting memory address for which all critical data overwrites begin for all wagering games activated on the wagering game machine.

2. The computer-implemented method of claim 1, wherein the wagering game machine is capable of loading multiple wagering games at different times each with differing critical data, wherein the non-volatile memory only stores critical data for any of the multiple wagering games one at a time, and wherein all required critical data for any of the multiple wagering games is limited to only the fixed memory size.

3. The computer-implemented method of claim 1, wherein the overwriting includes overwriting all critical data for another wagering game that was previously stored on the non-volatile memory store.

4. The computer-implemented method of claim 1, wherein the wagering game comprises a specific combination of game theme and wager denomination value, and wherein the determining that the copy of critical data is stored on the backing store for previous states of game play for the wagering game further comprises:

determining that one critical data set, of a plurality of critical data sets stored on the backing store, relates to the same specific combination of game theme and wagering denomination value; and determining that the one critical data set was most recently stored for the specific combination of game theme and wagering denomination value.

5. The computer-implemented method of claim 1, further comprising:

detecting an unexpected power loss to the wagering game machine while overwriting the entire contents of the non-volatile memory store with the copy of critical data;

restoring power to the wagering game machine; and overwriting, again, the entire contents of the non-volatile memory store with the copy of critical data.

6. The computer-implemented method of claim 1 further comprising:

determining that the copy of critical data has been modified on the non-volatile memory store with new critical data for the wagering game;

creating an additional copy of critical data, wherein said creating comprises copying the entire contents of the non-volatile memory store, resulting in the additional copy of critical data also of the fixed memory size that includes the new critical data for the wagering game; and updating the backing store with the additional copy of the critical data.

7. A system comprising:

a backing store configured to store critical data copies for a plurality of wagering games;

a non-volatile random access memory configured to store critical data for only a single active wagering game at a time;

one or more processors; and one or more memory storage devices configured to store instructions, which when executed by at least one of the one or more processors cause the system to perform operations to receive a request to activate a first wagering game, receive a critical data copy from the backing store for the first wagering game, wherein the critical data copy includes data from a previous state of the first wagering game, and overwrite an entire contents of the non-volatile random access memory with the critical data copy, the overwrite to start from a fixed memory address in the non-volatile random access memory at which all critical data overwrites begin, wherein the overwrite is to replace all critical data for a second wagering game that was previously played via a wagering game machine, wherein all critical data overwrites from the backing store are overwritten to the same fixed memory address in the non-volatile random access memory, wherein the fixed memory address is a first writable memory address available on the non-volatile random access memory, and wherein the non-volatile random access memory is overwritten without erasing data and without dynamically allocating memory space on the non-volatile random access memory.

8. The system of claim 7, wherein critical data for the first wagering game comprises any one or more of wager denomination values, game play outcomes, game meters, and player account transactions for a required number of plays of the first wagering game.

9. The system of claim 7, wherein the one or more memory storage devices are configured to store instructions, which when executed by at least one of the one or more processors cause the system to perform operations to copy modified critical data for the first wagering game by copying the entire contents of the non-volatile random access memory, starting at the fixed memory address, to a backing-store memory address, and wherein the wagering game machine further comprises a memory location store configured to record the backing-store memory address.

10. The system of claim 7, wherein the one or more memory storage devices are configured to store instructions, which when executed by at least one of the one or more processors cause the system to perform operations to receive a request to activate a third wagering game after the first wagering game is activated, detect an additional critical data copy on the backing store containing critical data for a previously played wagering game with data requirements matching the third wagering game for a combination of a game theme and a game denomination, access the additional critical data copy; and overwrite all of the critical data of the first wagering game in the non-volatile random access memory with the additional critical data set copy on the backing store starting at the fixed memory address within the non-volatile random access memory.

11. The system of claim 10, wherein the additional critical data copy comprises a fixed data size equivalent to the entire contents of the non-volatile random access memory, and wherein the one or more memory storage devices are configured to store instructions, which when executed by at least one of the one or more processors cause the system to perform operations to generate all critical data sets for all wagering games on the wagering game machine to have the fixed data size.

12. The system of claim 7, wherein the processor is further configured to copy an updated critical data set from the non-volatile random access memory to the backing store, detect an unexpected power loss while copying the updated critical data set to the backing store, restore power to the wagering game machine, verify that the updated critical data set copied to the backing store is invalid, and recopy the updated critical data set to the backing store.

13. The system of claim 7, wherein the one or more memory storage devices are configured to store instructions, which when executed by at least one of the one or more processors cause the system to perform operations to, activate the first wagering game, detect changes made to critical data of the first wagering game on the non-volatile memory store while the first wagering game is active, and update the backing store with the changes made to the critical data for the first wagering game on the non-volatile random access memory.

14. One or more non-transitory machine-readable storage media having instructions stored thereon, which when executed by a set of one or more processors causes the set of one or more processors to perform operations comprising:

detecting a request to change a first denomination value on a wagering game machine to a second denomination value;

making a copy of an entire contents of a non-volatile memory store of a wagering game machine in response to detecting the request to the change the first denomination value to the second denomination value, wherein the non-volatile memory store includes critical data for only one wagering game of the first denomination value, wherein size for an entire amount of critical data for any active wagering game played on the wagering game machine is required to be equivalent to a size of a memory capacity of the non-volatile memory store, and wherein critical data for all active wagering games played on the wagering game machine is required to be stored at a same fixed memory address block within the non-volatile memory store; and providing the copy of the entire contents of the non-volatile memory store with the critical data for storage in a backing store.

15. The one or more non-transitory machine-readable media of claim 14, wherein the wagering game machine is capable of processing content for multiple wagering games, with differing wagering game themes, and wherein the wagering game machine is configured to only store critical data for one of the multiple wagering games themes at a time in the non-volatile memory store.

16. The one or more non-transitory machine-readable media of claim 14, said operations further comprising:

after detecting the request to change the first denomination value to the second denomination value, accessing a critical data set copy on the backing store containing critical data for an additional wagering game that was previously played on the wagering game machine, wherein the additional wagering game is of the second denomination value; and without erasing data from the non-volatile memory store and without dynamically allocating space on the non-volatile memory store, overwriting the entire fixed memory address block within the non-volatile memory store with the critical data set copy on the backing store so that the non-volatile memory store includes only critical data for the additional wagering game.

17. The one or more non-transitory machine-readable media of claim 14, said operations further comprising:

updating the backing store with changes made to the critical data on the non-volatile memory store for the wagering game.

18. An apparatus comprising:

a processor; and a game control module configured to receive a request to activate a first wagering game on a wagering game machine, the first wagering game having a first game theme and a first wager denomination value, access a critical data set copy on a backing store containing critical data for a second wagering game previously played on the wagering game machine, the second wagering game having a second game theme matching the first theme and a second wager denomination value matching the first wager denomination value, without erasing data from a non-volatile memory store, overwrite an entire contents of the non-volatile memory store with the critical data set copy on the backing store, so that the non-volatile memory store includes only the critical data set copy after the overwrite, and wherein a data size of all critical data for any wagering game played on the wagering game machine at one time is required to be a fixed data size equivalent to a memory capacity of the non-volatile memory store, receive new critical data for the first wagering game during a wagering game session, and update the non-volatile memory store with the new critical data for the first wagering game while limiting all critical data on the non-volatile memory store for the first wagering game to the fixed data size.

19. The apparatus of claim 18, wherein the non-volatile memory store contains critical data for a third wagering game that had most recently been played on the wagering game machine, and wherein the game control module is further configured to overwrite all of the critical data for the third wagering game within the non-volatile memory store with the critical data set copy.

20. A wagering game machine comprising:

means for storing critical data for wagering game content of a given game theme within a non-volatile memory store on the wagering game machine, wherein the wagering game machine is configured to provide a plurality of different wager denomination values for the wagering game theme, and wherein the wagering game machine is configured to store, at any given time, critical data in the non-volatile memory store for only one of the plurality of different wager denomination values;

means for detecting a request to change a first wager denomination value of the plurality of different wager denomination values to a second wager denomination value of the plurality of different wager denomination values;

in response to the detecting the request to change the first wager denomination value of the second wager denomination value, means for accessing a first critical data set copy on a backing store containing critical data for the second wager denomination value; and means for overwriting an entire contents of the non-volatile memory store with the first critical data set copy on the backing store starting at a fixed memory address at a beginning of a fixed-sized memory block for the non-volatile memory store, wherein a data size of all critical data for any wagering game played on the wagering game machine is required to be a fixed data size for the fixed-sized memory block equivalent to a memory capacity of the non-volatile memory store.

21. The wagering game machine of claim 20, further comprising:

prior to the detecting the request to change the first wager denomination value to the second wager denomination value, means for presenting the wagering game content on the wagering game machine;

means for updating the fixed-size memory block within the non-volatile memory store with updated critical data for one or more game plays of the wagering game content of the first wager denomination value; and after the detecting the request to change the first wager denomination value to the second wager denomination value, means for copying the fixed-size memory block of critical data for the first wagering game to the backing store, resulting in a second critical data set copy on the backing store.

22. The wagering game machine of claim 20, wherein the critical data comprises any one or more of game meters and game history required by a wagering regulation to be stored on the non-volatile memory store for a pre-determined number of previous game plays for the wagering game.

* * * * *